United States Patent
Yamada et al.

(10) Patent No.: US 6,315,373 B1
(45) Date of Patent: Nov. 13, 2001

(54) ROLL CONTROL DEVICE OF VEHICLE MANAGEABLE OF SUDDEN FAILURE OF ROLLING CONDITION DETECTION MEANS

(75) Inventors: Noritaka Yamada, Mishima; Akira Nagae, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/520,789

(22) Filed: Mar. 8, 2000

(30) Foreign Application Priority Data

May 26, 1999 (JP) .................................................. 11-145976

(51) Int. Cl.$^7$ ....................................................... B60T 8/32
(52) U.S. Cl. ............................ 303/191; 303/182; 180/282
(58) Field of Search ..................................... 303/191, 146, 303/140, 122.02, 182; 180/282, 271, 5.51

(56) References Cited

U.S. PATENT DOCUMENTS

| | | |
|---|---|---|
| 4,625,993 | 12/1986 | Williams et al. . |
| 4,803,627 | 2/1989 | Yasuike et al. . |

(List continued on next page.)

FOREIGN PATENT DOCUMENTS

| | | |
|---|---|---|
| 196 32 943 A1 | 2/1998 | (DE) . |
| 196 38 280 A1 | 3/1998 | (DE) . |
| 197 46 889 A1 | 5/1998 | (DE) . |
| 197 47 144 A1 | 6/1998 | (DE) . |
| 1055577-A1 * | 11/2000 | (EP) . |
| 6-297985 | 10/1994 | (JP) . |
| 10-16744 | 1/1998 | (JP) . |
| 10-81215 | 3/1998 | (JP) . |
| 10-278762 | 10/1998 | (JP) . |

Primary Examiner—Robert J. Oberleitner
Assistant Examiner—Xuan Lan Nguyen
(74) Attorney, Agent, or Firm—Oliff & Berridge, PLC

(57) ABSTRACT

A roll control device of a vehicle for executing a roll suppress braking according to a detection of a rolling condition of the vehicle so that the braking is executed when the rolling condition increases beyond a first threshold value and the braking is canceled according to a normal brake ending schedule when the rolling condition subsides below a second threshold value lower than the first threshold value, wherein when an abnormal condition occurs about the detection of the rolling condition, the braking is canceled according to an abnormal brake ending schedule at a less quickness than according to the normal brake ending schedule, even before the rolling condition subsides below the second threshold value.

13 Claims, 4 Drawing Sheets

U.S. PATENT DOCUMENTS

| | | |
|---|---|---|
| 4,807,128 | 2/1989 | Ikemoto et al. . |
| 4,809,176 | 2/1989 | Oowa et al. . |
| 4,881,785 * | 11/1989 | Ushijima et al. ............. 303/111 |
| 4,898,431 | 2/1990 | Karnopp et al. . |
| 5,016,910 | 5/1991 | Nagai . |
| 5,134,352 | 7/1992 | Matsumoto et al. . |
| 5,172,961 | 12/1992 | Inoue et al. . |
| 5,212,640 * | 5/1993 | Matsuda ............. 364/424.03 |
| 5,229,944 | 7/1993 | Yasuno . |
| 5,344,224 | 9/1994 | Yasuno . |
| 5,627,756 * | 5/1997 | Fukada et al. ......... 364/426.01 |
| 5,640,324 | 6/1997 | Imagaki . |
| 5,654,906 * | 8/1997 | Youngquist ............. 364/571.01 |
| 5,673,981 | 10/1997 | Higashimata et al. . |
| 5,700,073 | 12/1997 | Hiwatashi et al. . |
| 5,702,165 * | 12/1997 | Koibuchi ............. 303/146 |
| 5,707,119 | 1/1998 | Monzaki . |
| 5,727,853 | 3/1998 | Monzaki . |
| 5,732,371 | 3/1998 | Fujita . |
| 5,738,420 | 4/1998 | Kawaguchi et al. . |
| 5,742,919 * | 4/1998 | Ashrafi et al. ............. 701/70 |
| 5,772,289 | 6/1998 | Nakazawa et al. . |
| 5,816,669 | 10/1998 | Hiwatashi et al. . |
| 5,822,709 | 10/1998 | Fujita . |
| 5,839,800 | 11/1998 | Koga et al. . |
| 5,850,616 | 12/1998 | Matsuno et al. . |
| 5,863,105 | 1/1999 | Sano . |
| 5,869,943 | 2/1999 | Nakashima et al. . |
| 5,890,084 | 3/1999 | Halasz et al. . |
| 5,899,952 | 5/1999 | Fukada . |
| 5,913,578 | 6/1999 | Tozu et al. . |
| 5,915,800 | 6/1999 | Hiwatashi et al. . |
| 5,941,334 | 8/1999 | Inagaki . |
| 5,948,027 | 9/1999 | Oliver, Jr. et al. . |
| 5,974,221 | 10/1999 | Kato et al. . |
| 6,002,974 | 12/1999 | Schiffmann . |
| 6,002,975 | 12/1999 | Schiffmann et al. . |
| 6,065,558 | 5/2000 | Wielenga . |
| 6,070,681 * | 6/2000 | Catanzarite et al. ............. 180/89.15 |
| 6,074,020 | 6/2000 | Takahashi et al. . |
| 6,081,761 | 6/2000 | Harada et al. . |
| 6,104,284 | 8/2000 | Otsuka . |
| 6,139,120 | 10/2000 | Fukuda . |
| 6,154,697 | 11/2000 | Otsuka . |
| 6,175,781 * | 1/2001 | Gesele et al. ............. 701/1 |
| 6,178,368 * | 1/2001 | Otake ............. 701/70 |
| 6,179,394 * | 1/2001 | Browalski et al. ............. 303/146 |
| 6,202,009 * | 3/2001 | Tseng ............. 701/34 |

* cited by examiner

ROLL CONTROL DEVICE OF VEHICLE MANAGEABLE OF SUDDEN FAILURE OF ROLLING CONDITION DETECTION MEANS

BACKGROUND OF THE INVENTION

1. Field of the Invention

The present invention relates to a roll control device of a vehicle such as an automobile, and more particularly, to a roll control device of a vehicle equipped with means for managing a sudden failure of means for detecting a rolling condition of the vehicle during a braking for the purpose of suppressing a rolling of the vehicle, the braking being controlled based upon the output of the rolling condition detection means.

2. Description of the Prior Art

As a roll control device of a vehicle such as an automobile, there is known a device described in Japanese Patent Laid-open Publication 6-297985 by the same applicant as the present application, wherein a parameter for judging a liability of the vehicle to roll down is calculated based upon a height of the center of gravity and a roll angle of the vehicle, so that a braking force is applied to a selected wheel or wheels for decelerating and suppressing the vehicle from rolling down when the parameter exceeds a predetermined threshold value. By such a roll control device, the vehicle is automatically suppressed from rolling so much as to approach a limit of rolling down during a turning, thereby relieving the driver from the requirement of a keen attention about a rolling condition or a control of vehicle speed during a turning.

In a roll control of a vehicle such as above, it is generally required to detect at least a lateral acceleration of the vehicle as a parameter for detecting a rolling condition of the vehicle for judging a requirement of the roll suppress control. When the lateral acceleration sensor does not operate normally, the roll control device does not operate normally. Therefore, when a failure has occurred in the lateral acceleration sensor, or more generally, in the rolling condition detection means including sensors such as the lateral acceleration sensor, the roll control device should no longer be operated. Further, if a failure of the lateral acceleration sensor or the rolling condition detection means occurred during the operation of the roll control device, the operation of the roll control device will have to be stopped as soon as possible.

In the known roll control devices, including that of the above-mentioned laid-open publication, when the roll control ends, the braking applied for the roll suppress purpose is generally rapidly canceled so that the vehicle is resumed as soon as possible to the normal control of the driver. When the braking is canceled according to a normal brake ending schedule at a normal end of the brake control that the rolling condition of the vehicle subsided below a predetermined threshold value, a cancellation of the braking at a relatively high speed will cause no shock or instability of the vehicle. However, if the braking is canceled according to the same normal brake ending schedule from a relatively large vehicle rolling condition due to an occurrence of a failure of a lateral acceleration sensor or rolling condition detection means during the operation of the roll suppress control, there would occur a substantial shock or instability of the vehicle.

SUMMARY OF THE INVENTION

In view of the above-mentioned problem in the abrupt cancellation of the braking due to a failure of a lateral acceleration sensor or rolling condition detection means during the operation of the roll suppress control, it is a primary object of the present invention to provide a roll control device of a vehicle improved with regard to its manageability of a sudden failure of a lateral acceleration sensor or rolling condition detection means during its operation of the roll suppress control.

According to the present invention, the above-mentioned primary object is accomplished by a roll control device of a vehicle having a front pair and a rear pair of wheels, a brake system, and a steeling system for steeling the vehicle, comprising:

means for detecting a rolling condition of the vehicle;

means for controlling the brake system for applying a braking for suppressing the rolling condition when the rolling condition increases beyond a first threshold value and to end the application of the braking according to a normal brake ending schedule when the rolling condition subsides below a second threshold value lower than the first threshold value;

means for judging an abnormal condition for ending the application of the braking before the rolling condition subsides below the second threshold value; and means for modifying the brake system control means so as to end the application of the braking according to an abnormal brake ending schedule which ends the application of the braking at a less quickness than the normal brake ending schedule when the abnormal condition judgment means judge the abnormal condition.

By the application of the roll suppress braking being ended at a less quickness at the time of abnormal ending than in the normal ending, even when the roll suppress braking is ended starting at a relatively high roll condition before it is subsided by the roll suppress control, a shock or an instability of the vehicle due to an abrupt cancellation of the roll suppress braking is avoided.

According to an embodiment of the roll control device of the present invention, the brake system control means may end the application of the braking according to the normal brake ending schedule such that the braking is decreased at a first rate, while the brake system control means end the application of the braking according to the abnormal brake ending schedule such that the braking is decreased at a second rate smaller than the first rate.

In the above embodiment, the second rate may be made smaller as the rolling condition of the vehicle at a moment at which the abnormal condition judgment means judge the abnormal condition is higher.

According to another embodiment, the brake system control means may end the application of the braking according to the normal brake ending schedule such that the braking is decreased gradually by starting at a moment at which the rolling condition subsides below the second threshold value, while the brake system control means end the application of the braking according to the abnormal brake ending schedule such that the braking is decreased gradually by starting as substantially delayed from a moment at which the abnormal condition judgment means judge the abnormal condition.

In the above embodiment, the time for delaying the start of the ending of the application of the braking may be made larger as the rolling condition at the moment at which the abnormal condition judgment means judge the abnormal condition is higher.

According to still another embodiment, the brake system control means may end the application of the braking according to the normal brake ending schedule such that the braking is decreased at a first rate, while the brake system control means end the application of the braking according to the abnormal brake ending schedule such that the braking is decreased at a second rate smaller than the first rate for a predetermined period, and then the braking is decreased at a third rate larger than the second rate.

In the above embodiment, the predetermined period for decreasing the braking at the second rate may be made longer as the rolling condition at a moment at which the abnormal condition judgment means judge the abnormal condition is higher.

The roll control device according to the present invention may comprise a lateral acceleration sensor for detecting lateral acceleration of the vehicle as a parameter for detecting the rolling condition of the vehicle, and the abnormal condition judgment means may judge the abnormal condition when the lateral acceleration sensor is judged as not operating normally.

An abnormal condition of such lateral acceleration sensor may be judged, when a vehicle speed sensor for detecting running speed of the vehicle and a yaw rate sensor for detecting yaw rate of the vehicle are available, according to if the lateral acceleration detected by the lateral acceleration sensor is different from a product of the vehicle speed detected by the vehicle speed sensor and the yaw rate detected by the yaw rate sensor beyond a predetermined threshold value.

In the roll control device according to the present invention, the brake system control means may control the brake system so as to apply a braking to at least one of the front pair of wheels serving at an outside of a turn for suppressing the rolling condition.

According to another aspect of the present invention, the abnormal condition judgment means may count occurrence of the abnormal judgment, and judge for the ending of the application of the braking when the count exceeds a threshold value predetermined therefor. By such an arrangement, an execution of the abnormal brake ending operation according to a false abnormal judgment due to some transient dissonance among outputs of sensors for judging an abnormal condition will be effectively avoided.

In counting the occurrence of the abnormal judgment, the abnormal condition judgment means may reset the count each time when the roll control device is put into operation, so that the occurrence of abnormal judgment is detected as a frequency in a daily operation of the vehicle.

Or, alternatively, the abnormal condition judgment means may maintain the count when the roll control device is put out of and into operation, so that the life of a sensor or sensors concerned with the judgment of the abnormal condition is checked.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 1:
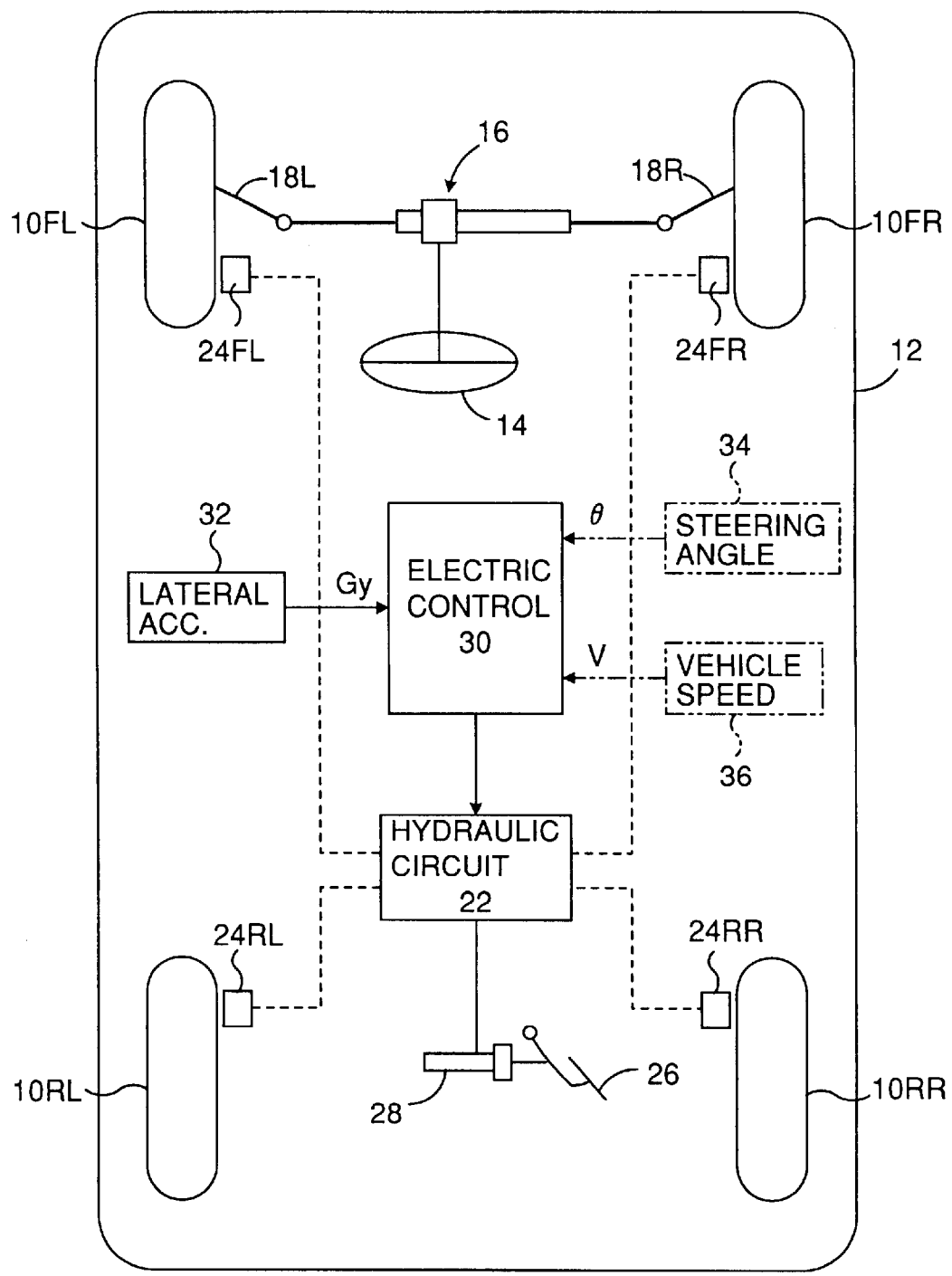
FIG. 1 is a diagrammatic plan view of a four wheeled vehicle incorporating an embodiment of the roll control device according to the present invention.

Referring to FIG. 1, a vehicle generally and diagrammatically designated by 12 has a pair of front left and front light wheels 10FL and 10FR and a pair of rear left and rear light wheels 10RL and 10RR. The pair of rear left and right wheels 10RL and 10RR are driven by a drive system not shown in the figure. The pair of front left and front right wheels 10FL and 10FR are steered by a steering system including a steering wheel 14, a rack-and-pinion assembly 16, and a left knuckle arm 18L and a right knuckle arm 18R. The four wheels are braked by a brake system including a hydraulic circuit 22, wheel cylinders 24FL, 24FR, 24RL and 24RR adapted to apply a braking force to the front left, front right, rear left and rear right wheels, respectively, according to a supply of a corresponding hydraulic pressure from the hydraulic circuit 22, a brake pedal 26 adapted to be depressed by a driver, a master cylinder 28 adapted to supply a pressurized brake fluid to the hydraulic circuit 22 according to a depression of the brake pedal by the driver, and electric control means 30 adapted to electrically control the hydraulic circuit 22.

The electric control means 30 are substantially made of a microcomputer which may be of a conventional construction having CPU, ROM, RAM, input and output port means and a common bus interconnecting those elements. The electric control means 30 are supplied with information with regard to such parameters as lateral acceleration Gy detected by a lateral acceleration sensor 32, steering angle θ detected by a steering angle sensor 34, and vehicle speed V detected by a vehicle speed sensor 36, conduct roll control calculations based upon the information with regard to those parameters as described in detail hereinbelow, and control the hydraulic circuit 22 so as to apply a braking force to a selected wheel or wheels, indeed generally a front wheel serving at the outside of a turn, for the purpose of suppressing the vehicle from rolling so much as to approach a limit of a rolling down.

As well known in the art, it is generally most effective for suppressing a four wheeled vehicle from rolling that a braking is applied to a front wheel serving at the outside of a turn, because there are two ways of suppressing the vehicle from rolling: One is to decrease the vehicle speed, and another is to increase the radius of the turning. By contrast, if a rear wheel or wheels are braked, the radius of the turning might be decreased by the vehicle slipping transversely outside of the turn at the rear wheels due to a saturation of the tire grip of the braked rear wheel or wheels according to an increase of the longitudinal force to be born by the braking, as the radius of the so-called friction circle remains constant. Therefore, in the embodiment of the present invention described hereinbelow, it is assumed that the roll suppress braking is applied to a front wheel serving at the outside of a turn. However, it will be appreciated by those skilled in the art that the roll suppress braking may be applied to other wheels, particularly in executing the concept of the present invention of modifying the brake system so as to end a roll suppress braking according to an abnormal brake ending schedule which ends the application of the braking at a less quickness than a normal brake ending schedule when an abnormal condition for ending the roll suppress braking was detected.

As described in detail hereinbelow, the electric control means 30 judge if the lateral acceleration sensor 32 is operating normally, and when it is judged that the lateral acceleration sensor 32 is not operating normally or ceased to operate normally during an application of a braking for the roll suppress control, the electric control means 30 end the roll suppress braking control according to an abnormal brake ending schedule which ends the roll suppress control without starting or cancels the application of the roll suppress braking at a less quickness than a normal brake ending schedule followed in normally ending the roll suppress braking.

The details of the roll suppress control means 30 will be described with respect to the operation of some embodiments thereof according the flowchart shown in FIG. 2.

When the vehicle of FIG. 1 was put into operation by its ignition switch (not shown) being turned on, in step 10 signals indicating the parameters GY, θ and V are read in. Then in step 20, roll angular velocity Rr is calculated according to a cyclic calculation based upon the following formula:

$$Rr \downarrow Rr + |(\omega o^2(Gy \cdot \phi o - R) - 2\omega o \cdot \xi \cdot Rr| \Delta T$$

In the above formula, ωo is a natural frequency of the vehicle body in the rolling, φo is a static roll angle per unit acceleration, ξ is a damping factor in the rolling, ΔT is a cycle time of the control process repeated through the flowchart, and R is a roll angle calculated in step 30 of a preceding cycle of the control process cyclically repeated through the flowchart.

In step 30, based upon the roll angular velocity Rr calculated in step 20, the roll angle R is calculated according to the following formula:

$$R \downarrow R + Rr \cdot \Delta T$$

As well known in the art, in such a cyclic calculation control as by the above two formulae, quantities to be determined by the cyclic calculations such as Rr and R are each first set at an appropriate initial value.

In step 40, a parameter herein called "roll value RV" is calculated to know the rolling condition of the vehicle according to the following formula, wherein Gylim is a standard value predetermined for evaluating the lateral acceleration Gy, and Rrlim is a standard value predetermined for evaluating the roll angular velocity Rr:

$$RV = Gy/Gylim + Rr/Rrlim$$

Thus, the roll value RV is a parameter which shows how the vehicle is approaching a liability limit of rolling down as its value increases. Since the rolling of the vehicle has two directions, i.e. left side rolling and right side rolling, when RV is expressed in a positive value for a right side rolling, a left side rolling is expressed by a negative value.

In step 50, it is judged if the absolute value of RV is equal to or greater than RVs, a first threshold value of RV predetermined for starting the roll suppress operation of the roll control device. When the answer is yes, the control proceeds to step 60, and a flag F is set to 1, and the control proceeds to step 70.

In step 70, it is judged if the lateral acceleration sensor 32 is operating normally. This judgement may be made such that a difference between the lateral acceleration Gy output from the lateral acceleration sensor 32 is not different from a product of the steering angle θ output from the steering angle sensor 34 and the vehicle speed V output from the vehicle speed sensor 36 beyond a predetermined threshold value.

Figure 3:
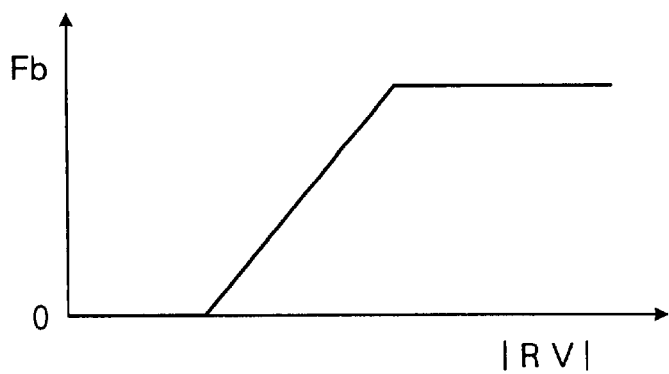
FIG. 3 is a graph showing an example of the relationship between the absolute value of a parameter RV herein called "roll value" and a braking force applied to a front wheel serving at the outside of a turn of the vehicle for a roll suppress control.

When the answer of step 70 is yes, the control proceeds to step 80, and a braking force Fb to be applied to a front wheel serving at the outside of a turn, as an embodiment, is calculated. This calculation may be made by referring to a map such as shown in FIG. 3, so that the braking force Fb is gradually increased according to an increase of the absolute value of RV beyond a predetermined value until it reaches a saturation value.

In step 90, a braking is executed by the hydraulic circuit 22 being operated by the electric control means 30 according to the magnitude of the braking force Fb calculated in step 80. Then the control returns to step 10, so as to repeat such a series of calculations and control through steps 10–90 as long as the rolling condition of the vehicle continues to require such a roll suppress control.

As a result of such a roll suppress control and/or a subsidence of the turning, the answer of step 50 will soon change to no. Then the control diverts to step 100, and it is judged if the flag F is equal to 1. When the control comes to step 100 after once having passed through step 60, the answer is yes, and then the control proceeds to step 110. When the control comes to step 100 from step 50 without ever passing through step 60, the answer is no, and the control immediately returns to step 10.

In step 110, it is judged if the absolute value of RV is smaller than a second threshold value RVe predetermined as a limit for ending the roll suppress control. As long as the answer of step 110 is no, the control proceeds to step 70. Therefore, the roll suppress control through steps 10–50, 70, 80 and 90 started by the absolute value of RV increasing beyond the first threshold value RVs is continued until the absolute value of RV subsides below the second threshold value RVe.

When the answer of step 110 changes to yes, the control proceeds to step 120, and a normal roll control ending is executed such that the braking force applied to the front wheel serving at the outside of the turn as an embodiment is canceled according to a normal brake ending schedule.

Figure 2:
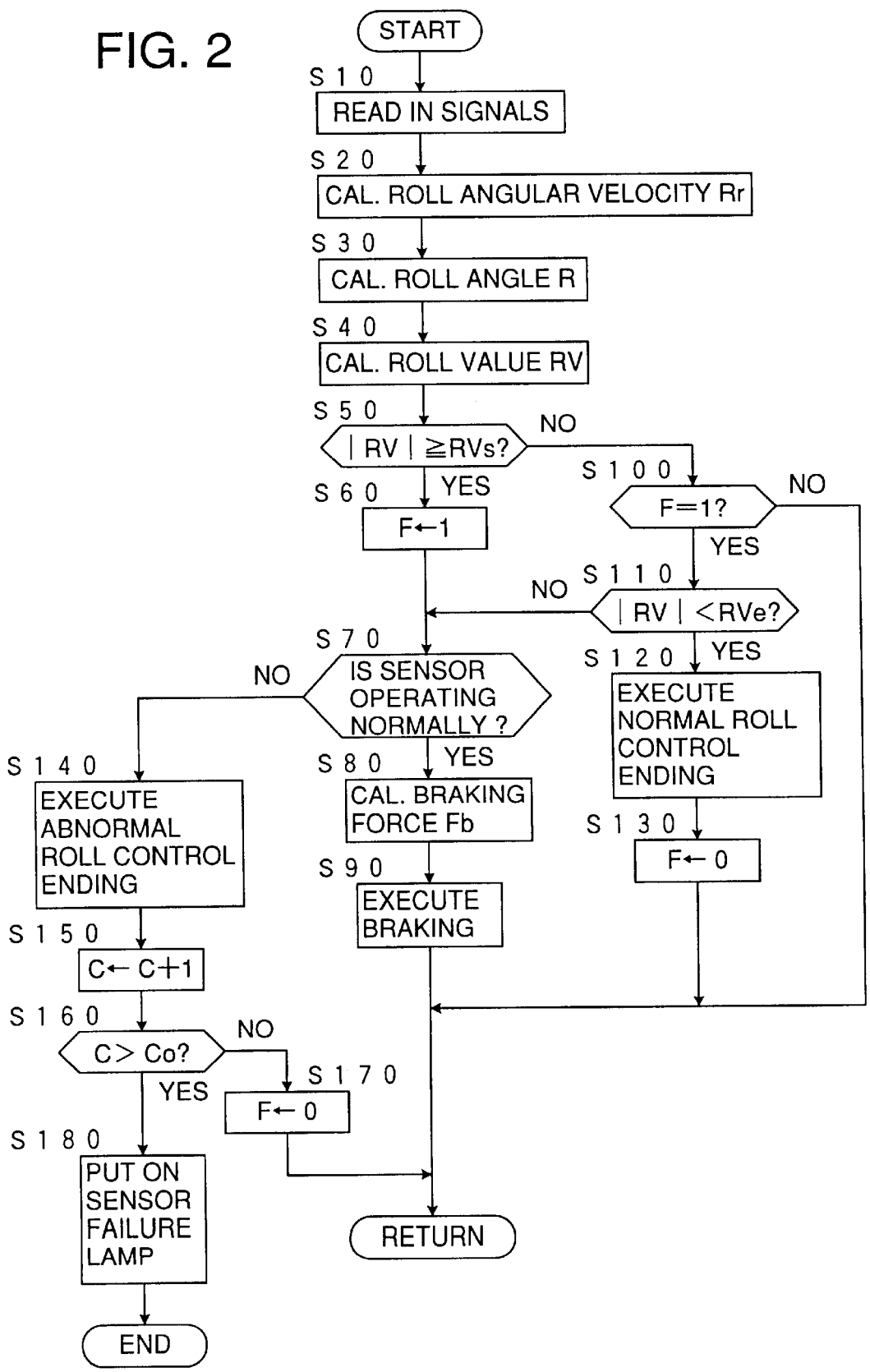
FIG. 2 is a flowchart showing details of the roll control device shown in FIG. 1 in the form of its operation.
Figure 4:
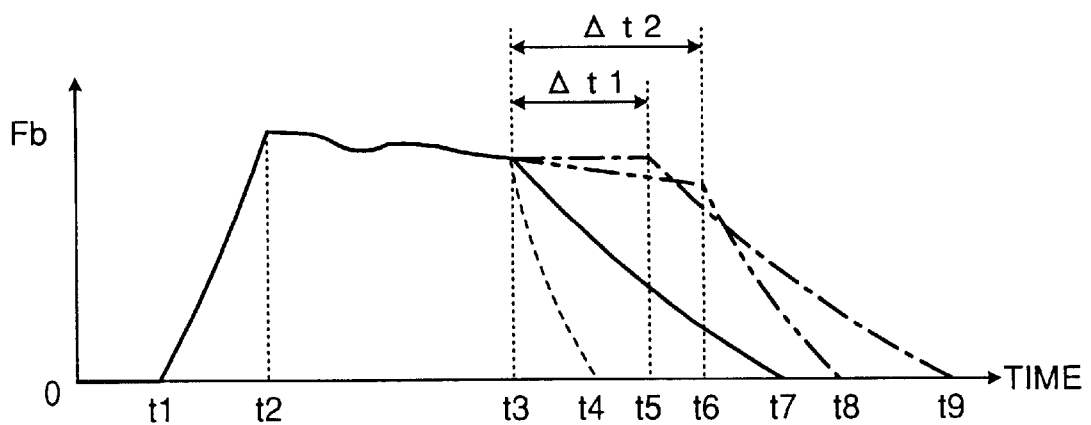
FIG. 4 is a graph showing several embodiments of a change of the roll suppress braking force according to the lapse of time.

FIG. 4 shows several embodiments regarding how the braking force Fb is increased and canceled when the roll suppress control is executed according to the flowchart of FIG. 2. It is assumed that when an application of the braking is started at time point t1, the braking force Fb is increased at a substantially constant rate until time point t2, and then the braking force is maintained for a while according to the calculation of the braking force Fb based upon the roll value RV, with the control process proceeding through steps 50, 60, 70, 80 and 90 when the absolute value of RV is equal to or greater than RVs, and then through steps 50, 100, 110, 70, 80 and 90 after the absolute value of RV has subsided below RVs.

Then, it is assumed that at time point t3 the rolling condition subsides so far that the control which has been proceeding from step 110 to step 70 now proceeds from step 110 to step 120. In step 120, the braking force is canceled by an execution of a normal roll control ending operation according to a normal brake ending schedule, whereby the braking force is canceled at a relatively high and substantially constant rate such as shown by a broken line in FIG. 4 so that the braking force is totally canceled at time point t4 within a relatively short period such as t3–t4. It will be noted that when the control has come to step 120, the stepwise progress of the control stays there for a period until the normal roll control ending operation is completed. When the normal roll control ending operation ends, the control proceeds to step 130, and the flag F is reset to 0. Then, the control returns to step 10.

When the lateral acceleration sensor 32 fails so as not to operate normally, it is detected in step 70 during the execution of the roll suppress brake control. When the answer of step 70 changes to no, the control proceeds to step 140. When the lateral acceleration sensor 32 has already been in a failure when the control reaches step 70 for the first time by the absolute value of RV first reaching RVs, the roll suppress braking is not yet substantially started. In this case, the execution of the abnormal roll control ending operation is just to end the roll suppress control without substantially starting it.

When it is assumed that a failure of the lateral acceleration sensor 32 occurs at time point t3 of FIG. 4 during a substantial execution of the roll suppress braking, an abnormal roll control ending operation is executed such that the braking force applied to the front wheel serving at the outside of the turn is canceled according to an abnormal brake ending schedule. An embodiment of the abnormal brake ending schedule is shown by a solid line in FIG. 4, whereby the braking force is canceled at a substantially constant rate lower than that of the normal brake ending schedule shown in the broken line, by taking a longer period such as t3–t7, in contrast to the period t3–t4 by the normal brake ending schedule. By decreasing the rate of canceling the braking force, even when the roll suppress braking is canceled starting at a moment at which the rolling condition of the vehicle is still relatively high such as not yet being subsided below the second threshold value RVe, the roll suppress braking is canceled relatively moderately, so that a shock or an instability of the vehicle due to an abrupt cancellation of the roll suppress control from a highly rolled condition is avoided.

Figure 5:
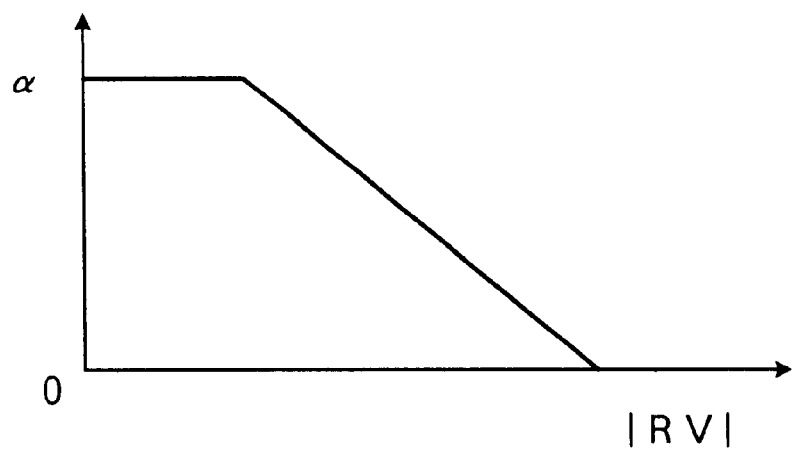
FIG. 5 is a graph showing an example of the relationship between the absolute value of the roll value RV at the moment of starting the abnormal brake ending operation and a cancellation rate a of the roll suppress braking force according to an embodiment of the invention.

The rate of canceling the braking force according to an abnormal schedule such as shown by the solid line, when denoted by $\alpha$, may be modified as shown in FIG. 5 according to the absolute value of RV, so that the rate $\alpha$ is gradually lowered as the absolute value of RV at the moment of starting the abnormal brake ending operation is higher.

Another embodiment of the abnormal brake ending schedule is shown in FIG. 4 by a dot-dash line. According to this schedule, assuming that the lateral acceleration sensor failed at time point t3, the application of the braking is maintained for a certain period $\Delta t1$ until time point t5, and thereafter the braking force is canceled at a substantially constant rate which is substantially the same as that of the first embodiment shown by the solid line. In this case, the time taken for the total cancellation of the braking force is further elongated such as to be t3–t9.

Figure 6:
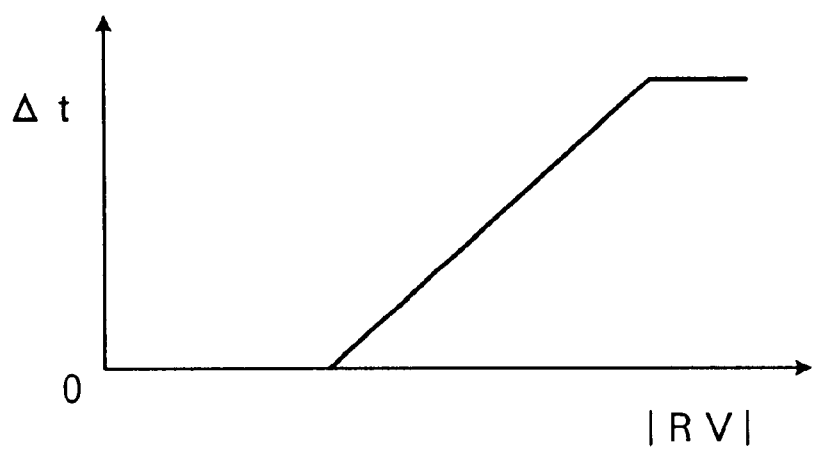
FIG. 6 is a graph showing an example of the relationship between the absolute value of the roll value RV at the moment of starting the abnormal brake ending operation and a delay time $\Delta t$ such as $\Delta t1$ and $\Delta t2$ shown in FIG. 4.

A still another embodiment of the abnormal brake ending schedule is shown in FIG. 4 by a two dots-dash line. According to this schedule, assuming that the lateral acceleration sensor failed at time point t3, the braking force is first very slowly decreased by taking a period such as A t2 longer than the period $\Delta t1$ until time point t6, and then the braking force is canceled at a relatively high substantially constant rate similar to that of the normal brake ending schedule shown by the broken line, so as to completely cancel the braking force at time point t8. In this case, although the time lapse between t3 and t8 is shorter than the time lapse between t3 and t9, according to the first gradual decreasing step by the period $\Delta t2$ longer than the period $\Delta t1$, the effect for avoiding a shock or an instability of the vehicle due to an abnormal cancellation of the braking will be the same as or better than that of the second embodiment shown by a dot-dash line. The delay period $\Delta t1$ or $\Delta t2$ of the second or third embodiment of the abnormal brake ending schedule may be varied according to the magnitude of the roll value RV at a time point t3 according to a map such as shown in FIG. 6.

In any event, when the control has come to step 140, the control stays there until the execution of the abnormal roll control ending operation is ended according to the abnormal brake ending schedule exemplarily shown in FIG. 4 or some other forms of schedule which would be obvious for those skilled in the art based upon the concept of the present invention. Then, the control proceeds to step 150.

In step 150, count C of a counter incorporated in the electric control means 30 is incremented by 1. This is to count the occurrence of the "no" judgment in step 70 about the normal operation of the lateral acceleration sensor 32. It will be probable that, although the lateral acceleration sensor is not in a failure, the lateral acceleration Gy output from the lateral acceleration sensor 32 differs much from the product of the steering angle 0 output from the steering angle sensor 34 and the vehicle speed V output from the vehicle speed sensor 36 due to some transient dissonance among the outputs of these sensors. Therefore, some certain times of occurrence of the abnormality judgement in step 70 should be allowed before determining a failure of the lateral acceleration sensor. Therefore, in step 160, it is judged if the count C is greater than a predetermined threshold value Co. When the answer is no, the control proceeds to step 170, where the flag F is reset to zero, and the control returns to step 10. In this connection, the count C may be reset to zero when the ignition switch is turned off so that the occurrence of the abnormality judgment is checked as a frequency during a daily operation, or the count C may be maintained even when the ignition switch is turned off so that the life of the lateral acceleration sensor is checked.

When the answer of step 160 has turned into yes, the failure of the lateral acceleration sensor 32 will be undoubted. Therefore, the control proceeds to step 180, and a sensor failure lamp (not shown) is put on. Then the control ends, no longer to operate, until a maintenance is applied to the lateral acceleration sensor.

Although the present invention has been described in detail with respect to some preferred embodiments thereof, it will be apparent for those skilled in the art that various modifications are possible with respect to the shown embodiments within the scope of the present invention.

What is claimed is:

1. A roll control device of a vehicle having a front pair and a rear pair of wheels, a brake system, and a steeling system for steering the vehicle, comprising:

means for detecting a rolling condition of the vehicle;
   means for controlling the brake system for applying a braking for suppressing the rolling condition when the rolling condition increases beyond a first threshold value and to end the application of the braking according to a normal brake ending schedule when the rolling condition subsides below a second threshold value lower than the first threshold value;
   means for judging an abnormal condition for ending the application of the braking before the tolling condition subsides below the second threshold value; and means for modifying the brake system control means so as to end the application of the braking according to an abnormal brake ending schedule which ends the application of the braking at a rate slower than the normal brake ending schedule when the abnormal condition judgment means judge the abnormal condition.

2. A roll control device according to claim 1, wherein the brake system control means end the application of the braking according to the normal brake ending schedule such that the braking is decreased at a first rate, while the brake system control means end the application of the braking according to the abnormal brake ending schedule such that the braking is decreased at a second rate smaller than the first rate.

3. A roll control device according to claim 2, wherein the second rate is made smaller as the rolling condition of the vehicle at a moment at which the abnormal condition judgment means judge the abnormal condition is higher.

4. A roll control device according to claim 1, wherein the brake system control means end the application of the braking according to the normal brake ending schedule such that the braking is decreased gradually by starting at a moment at which the rolling condition subsides below the second threshold value, while the brake system control means end the application of the braking according to the abnormal brake ending schedule such that the braking is decreased gradually by starting as substantially delayed from a moment at which the abnormal condition judgment means judge the abnormal condition.

5. A roll control device according to claim 4, wherein the time for delaying the start of the ending of the application of the braking is made larger as the rolling condition at the moment at which the abnormal condition judgment means judge the abnormal condition is higher.

6. A roll control device according to claim 1, wherein the brake system control means end the application of the braking according to the normal brake ending schedule such that the braking is decreased at a first rate, while the brake system control means end the application of the braking according to the abnormal brake ending schedule such that the braking force is decreased at a second rate smaller than the first rate for a predetermined period, and then the braking is decreased at a third rate larger than the second rate.

7. A roll control device according to claim 6, wherein the predetermined period for decreasing the braking at the second rate is made longer as the rolling condition at a moment at which the abnormal condition judgment means judge the abnormal condition is higher.

8. A roll control device according to claim 1, further comprising a lateral acceleration sensor for detecting lateral acceleration of the vehicle as a parameter for detecting the rolling condition of the vehicle, and the abnormal condition judgment means judge the abnormal condition when the lateral acceleration sensor is judged as not operating normally.

9. A roll control device according to claim 8, further comprising a vehicle speed sensor for detecting running speed of the vehicle, and a yaw rate sensor for detecting yaw rate of the vehicle, wherein the abnormal condition judgment means judge the abnormal condition when the lateral acceleration detected by the lateral acceleration sensor is different from a product of the vehicle speed detected by the vehicle speed sensor and the yaw rate detected by the yaw rate sensor beyond a predetermined threshold value.

10. A roll control device according to claim 1, wherein the brake system control means control the brake system so as to apply a braking to at least one of the front pair of wheels serving at an outside of a turn for suppressing the rolling condition.

11. A roll control device according to claim 1, wherein the abnormal condition judgment means count occurrence of the abnormal judgment, and judge for the ending of the application of the braking when the count exceeds a threshold value predetermined therefor.

12. A roll control device according to claim 11, wherein the abnormal condition judgment means reset the count each time when the roll control device is put into operation.

13. A roll control device according to claim 11, wherein the abnormal condition judgment means maintain the count when the roll control device is put out of and into operation.

* * * * *